US008924877B2

(12) United States Patent
Foslien et al.

(10) Patent No.: US 8,924,877 B2
(45) Date of Patent: Dec. 30, 2014

(54) APPARATUS AND METHOD FOR DISPLAYING CHANGES IN STATISTICAL PARAMETERS IN A PROCESS CONTROL SYSTEM

(75) Inventors: Wendy K. Foslien, Woodbury, MN (US); Soumitri N. Kolavennu, Minneapolis, MN (US); Dinkar Mylaraswamy, Fridley, MN (US); Dal Vernon C. Reising, Canton, MI (US)

(73) Assignee: Honeywell International Inc., Morristown, NJ (US)

( * ) Notice: Subject to any disclaimer, the term of this patent is extended or adjusted under 35 U.S.C. 154(b) by 1396 days.

(21) Appl. No.: 11/978,349

(22) Filed: Oct. 29, 2007

(65) Prior Publication Data
US 2009/0112532 A1    Apr. 30, 2009

(51) Int. Cl.
| | | |
|---|---|---|
| G06F 3/048 | (2013.01) | |
| G06F 17/18 | (2006.01) | |
| G06F 17/30 | (2006.01) | |
| G06T 11/20 | (2006.01) | |
| G05B 15/02 | (2006.01) | |
| G06F 3/0481 | (2013.01) | |
| G05B 23/02 | (2006.01) | |

(52) U.S. Cl.
CPC ............ *G06F 3/04812* (2013.01); *G06F 17/18* (2013.01); *G06F 17/30958* (2013.01); *G06T 11/206* (2013.01); *G05B 15/02* (2013.01); *G06F 17/30572* (2013.01); *G06F 17/30994* (2013.01); *G05B 23/0267* (2013.01)
USPC ........... 715/771; 715/773; 715/856; 715/859; 715/860; 715/862

(58) Field of Classification Search
CPC    G05B 23/0267; G05B 15/02; G06F 3/04812; G06F 17/30572; G06F 17/3096; G06F 17/30994; G06F 17/18; G06T 11/206
USPC .................. 715/771, 773, 856, 859, 860, 862
See application file for complete search history.

(56) References Cited

U.S. PATENT DOCUMENTS

| | | | | |
|---|---|---|---|---|
| 5,949,678 | A | * | 9/1999 | Wold et al. ...................... 700/83 |
| 6,076,048 | A | | 6/2000 | Gunther et al. |
| 6,356,256 | B1 | * | 3/2002 | Leftwich ........................ 345/157 |
| 6,556,223 | B1 | * | 4/2003 | Tran et al. ...................... 715/804 |
| 7,181,654 | B2 | | 2/2007 | Ford, Jr. et al. |
| 7,349,746 | B2 | | 3/2008 | Emigholz et al. |

(Continued)

OTHER PUBLICATIONS

Bill Wood, "Rage-Of-Change Analysis," Feb. 2004.*

(Continued)

*Primary Examiner* — Patrick Riegler
*Assistant Examiner* — Justin R Blaufeld

(57) ABSTRACT

At least one statistical output associated with a process model and a rate of change associated with each statistical output is identified, such as by using historical data associated with the process model. The statistical outputs and the rates of change are used to generate a graphical display, such as a phase plane plot. Each point in the display is based on one of the statistical outputs and its associated rate of change. The graphical display could include multiple portions, such as quadrants, and one of the portions can be selected and highlighted. The different portions of the graphical display may represent whether the process model is a poor fit to current conditions and approaching a better fit, a poor fit and approaching a poorer fit, a good fit and approaching a poorer fit, and a good fit and approaching a better fit.

20 Claims, 3 Drawing Sheets

(56) References Cited

U.S. PATENT DOCUMENTS

| | | | |
|---|---|---|---|
| 7,421,351 | B2 | 9/2008 | Navratil |
| 2003/0028269 | A1* | 2/2003 | Spriggs et al. ............... 700/83 |
| 2006/0058898 | A1 | 3/2006 | Emigholz et al. |
| 2006/0293763 | A1 | 12/2006 | Rivard |
| 2007/0055403 | A1 | 3/2007 | Macdonald et al. |
| 2007/0088534 | A1 | 4/2007 | MacArthur et al. |
| 2007/0244575 | A1 | 10/2007 | Wojsznis et al. |
| 2007/0282777 | A1 | 12/2007 | Guralnik et al. |
| 2008/0154544 | A1 | 6/2008 | Navratil |
| 2008/0167842 | A1 | 7/2008 | Cochran et al. |

OTHER PUBLICATIONS

Frank Starmer, "Graphical Solutions: Phase Plane Analysis," May 2004.*

North Canton City Schools, "Excel Activities for the Classroom," http://www.northcanton.sparcc.org/~technology/excel/files/misleading_graphs.html, Mar. 2005.*

Microsoft Corporation, "Add data to a chart," http://office.microsoft.com/en-us/excel-help/add-data-to-a-chart-HP005198472.aspx, Sep. 2005.*

McGill, "Phase-Plane Plotting the Nondurable Goods Index," Oct. 2003, http://www.psych.mcgill.ca/misc/fda/files/Sardinia-PP-PlotNonDurableGoodsIndex.ppt.*

"Overview of the phase plane method for second order systems", Jan. 27, 2005, 3 pages.

The Phase Plane, A Tool for Gaining Insight Into Nonlinear System Behavior, 8 pages.

* cited by examiner

APPARATUS AND METHOD FOR DISPLAYING CHANGES IN STATISTICAL PARAMETERS IN A PROCESS CONTROL SYSTEM

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to process control systems and more specifically to an apparatus and method for displaying changes in statistical parameters in a process control system.

BACKGROUND

Processing facilities are often managed using process control systems. Example processing facilities include manufacturing plants, chemical plants, crude oil refineries, and ore processing plants. Among other operations, process control systems typically manage the use of motors, valves, and other industrial equipment in the processing facilities.

In conventional process control systems, controllers are often used to control the operation of the industrial equipment in the processing facilities. The controllers could, for example, monitor the operation of the industrial equipment, provide control signals to the industrial equipment, and generate alarms or other notifications when malfunctions or other problems are detected. These controllers often use models to generate the control signals, where the models define how the control signals are generated based on input signals received by the controllers. In many conventional process control systems, outputs of the controller models are viewed by human operators, who monitor the outputs in an attempt to identify problems in the process control system.

SUMMARY

This disclosure provides an apparatus and method for displaying changes in statistical parameters in a process control system.

In a first embodiment, a method includes identifying at least one statistical output associated with a process model and a rate of change associated with each statistical output. The method also includes generating a graphical display that has at least one point, where each point is based on one of the statistical outputs and its associated rate of change. In addition, the method includes presenting the graphical display to a user.

In particular embodiments, the process model represents a multivariable statistical model. The at least one statistical output may include at least one deviation of multiple output signals of the multivariable statistical model from a normal correlation pattern and/or at least one correlation factor among multiple variables of the multivariable statistical model.

In other particular embodiments, the graphical display includes multiple portions. The method also includes selecting one of the portions of the graphical display based on the at least one point. The method may further include highlighting the selected portion of the graphical display, such as by using an indicator that depends on the portion selected.

In yet other particular embodiments, the graphical display includes multiple points, and the points are positioned in one or more portions of the graphical display. Also, the different portions of the graphical display may be associated with both (i) a fit of the process model to current process conditions and (ii) a change in the model fit as a function of time. For example, the different portions could represent whether the process model is a poor fit to current conditions and approaching a better fit, a poor fit to current conditions and approaching a poorer fit, a good fit to current conditions and approaching a poorer fit, and a good fit to current conditions and approaching a better fit.

In a second embodiment, an apparatus includes at least one memory configured to store at least one statistical output associated with a process model and a rate of change associated with each statistical output. The apparatus also includes at least one processor configured to generate a graphical display and present the graphical display to a user. The graphical display includes at least one point, where each point is based on one of the statistical outputs and its associated rate of change.

In a third embodiment, a computer program is embodied on a computer readable medium. The computer program includes computer readable program code for identifying at least one statistical output associated with a process model and a rate of change associated with each statistical output. The computer program also includes computer readable program code for generating a graphical display that has at least one point, where each point is based on one of the statistical outputs and its associated rate of change. The computer program further includes computer readable program code for presenting the graphical display to a user.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
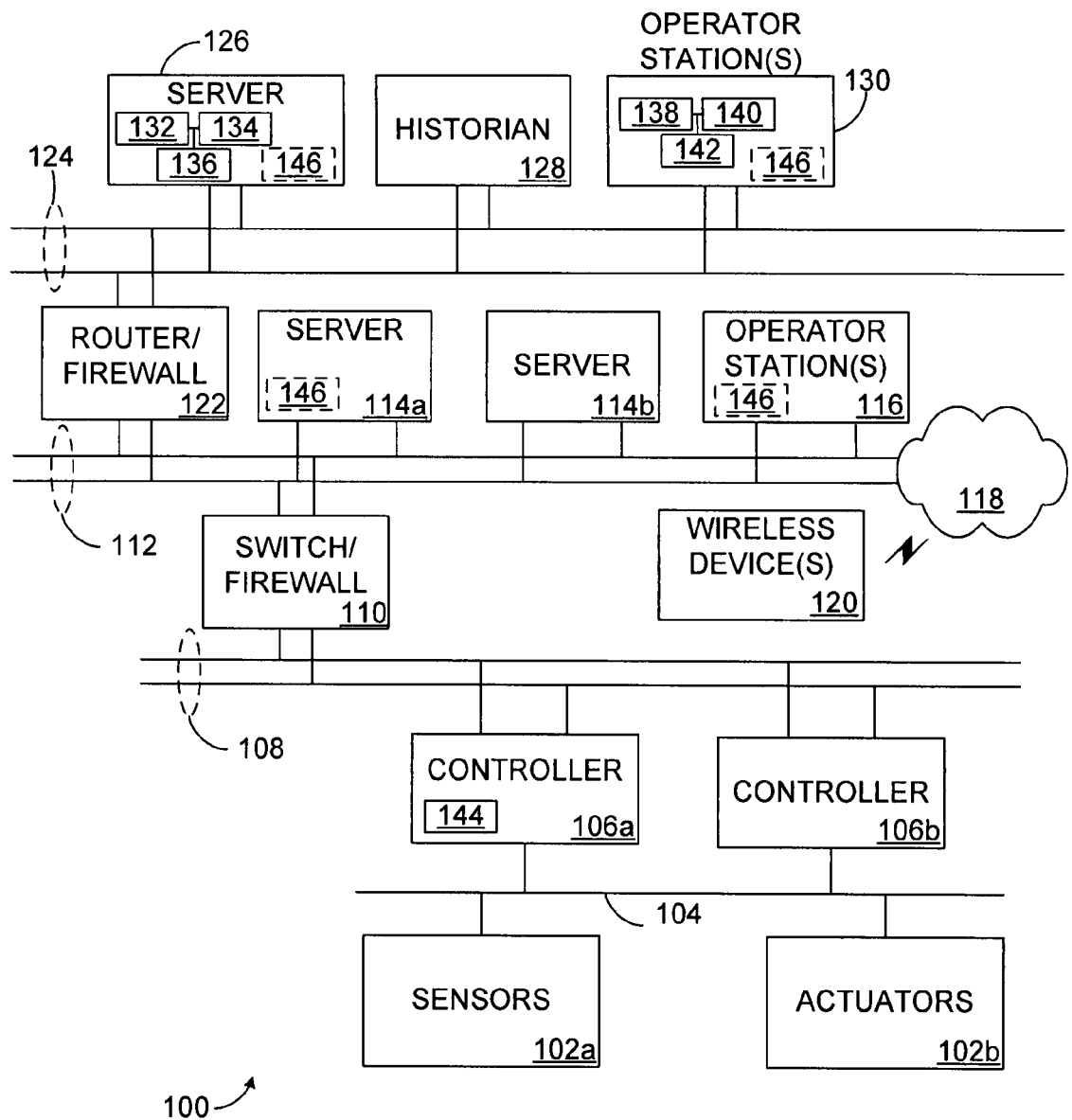
FIG. 1 illustrates an example process control system according to this disclosure.
Figure 2:
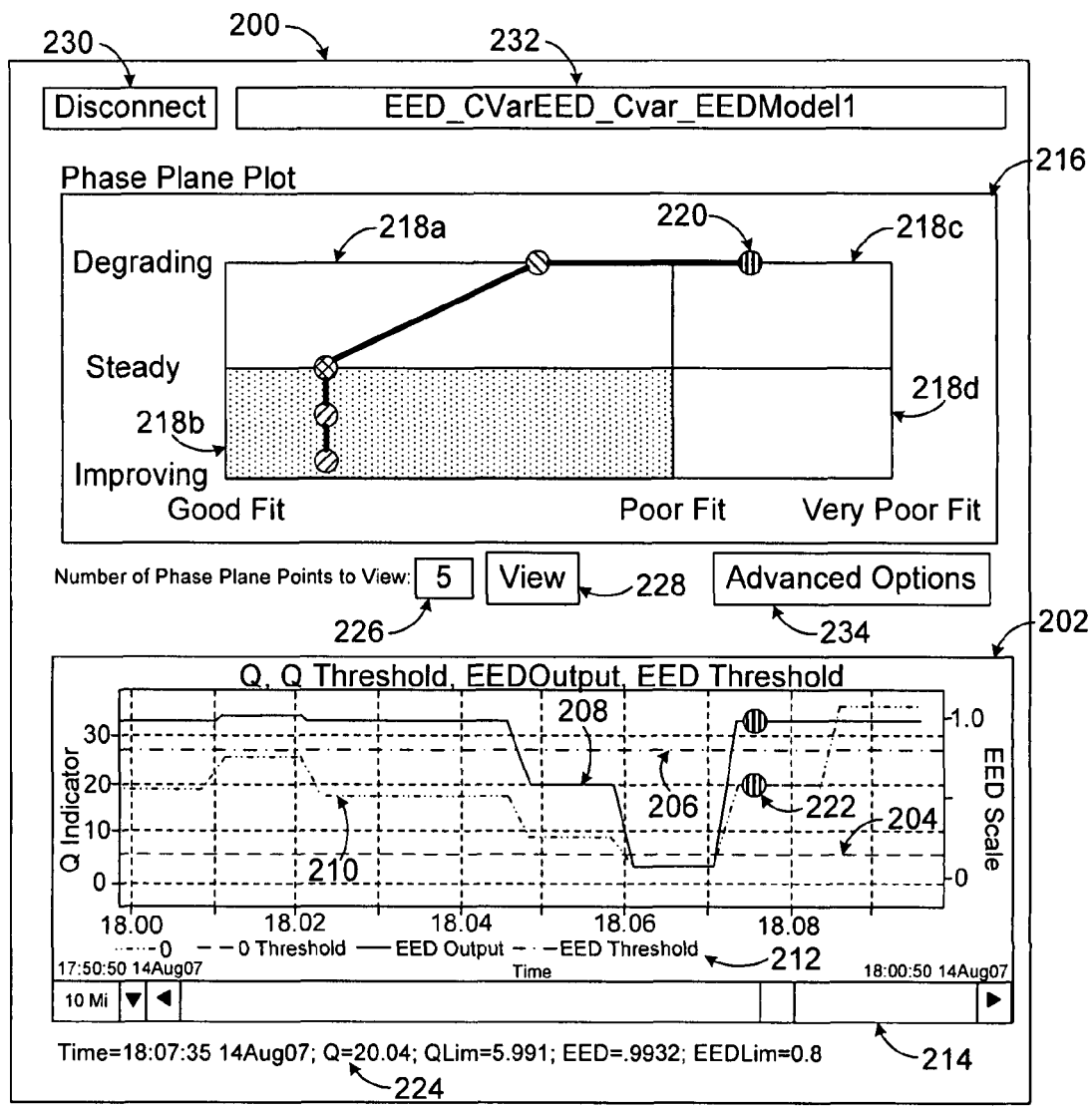
FIG. 2 illustrates an example graphical display presenting changes in statistical parameters in a process control system according to this disclosure.
Figure 3:
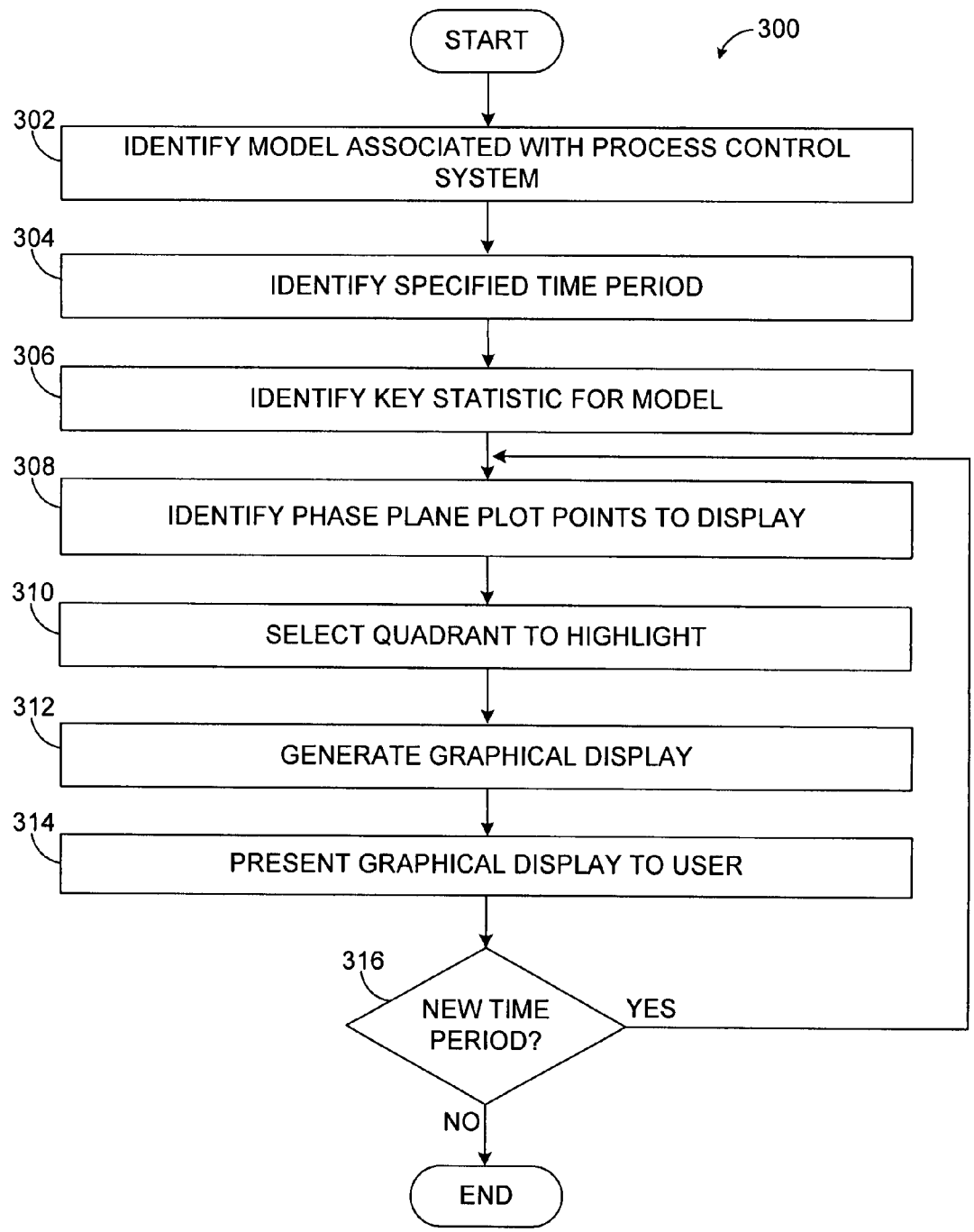
FIG. 3 illustrates an example method for displaying changes in statistical parameters in a process control system according to this disclosure.

FIGS. 1 through 3, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

FIG. 1 illustrates an example process control system 100 according to this disclosure. The embodiment of the process control system 100 shown in FIG. 1 is for illustration only. Other embodiments of the process control system 100 may be used without departing from the scope of this disclosure.

In this example embodiment, the process control system 100 includes various components that facilitate production or processing of at least one product or other material, such as one or more sensors 102a and one or more actuators 102b. The sensors 102a and actuators 102b represent components in a process system that may perform any of a wide variety of functions. For example, the sensors 102a could measure a wide variety of characteristics in the process control system 100, such as temperature, pressure, or flow rate. Also, the actuators 102b could alter a wide variety of characteristics in the process control system 100, such as heaters, motors, catalytic crackers, or valves. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting conditions in a process system. Also, a process system may generally represent any system or portion thereof configured to process one or more products or other materials in some manner.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

Two controllers 106a-106b are coupled to the network 104. The controllers 106a-106b may, among other things, use the measurements from the sensors 102a to control the operation of the actuators 102b. For example, the controllers 106a-106b could receive measurement data from the sensors 102a and use the measurement data to generate control signals for the actuators 102b. Each of the controllers 106a-106b includes any hardware, software, firmware, or combination thereof for interacting with the sensors 102a and controlling the actuators 102b. The controllers 106a-106b could, for example, represent multivariable controllers or other types of controllers. Each of the controllers 106a-106b could, for example, represent a computing device running a MICROSOFT WINDOWS operating system.

Two networks 108 are coupled to the controllers 106a-106b. The networks 108 facilitate interaction with the controllers 106a-106b, such as by transporting data to and from the controllers 106a-106b. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

Two servers 114a-114b are coupled to the networks 112. The servers 114a-114b perform various functions to support the operation and control of the controllers 106a-106b, sensors 102a, and actuators 102b. For example, the servers 114a-114b could log information collected or generated by the controllers 106a-106b, such as measurement data from the sensors 102a or control signals for the actuators 102b. The servers 114a-114b could also execute applications that control the operation of the controllers 106a-106b, thereby controlling the operation of the actuators 102b. In addition, the servers 114a-114b could provide secure access to the controllers 106a-106b. Each of the servers 114a-114b includes any hardware, software, firmware, or combination thereof for providing access to, control of, or operations related to the controllers 106a-106b. Each of the servers 114a-114b could, for example, represent a computing device running a MICROSOFT WINDOWS operating system.

One or more operator stations 116 are coupled to the networks 112. The operator stations 116 represent computing or communication devices providing user access to the servers 114a-114b, which could then provide user access to the controllers 106a-106b (and possibly the sensors 102a and actuators 102b). As particular examples, the operator stations 116 could allow users to review the operational history of the sensors 102a and actuators 102b using information collected by the controllers 106a-106b and/or the servers 114a-114b. The operator stations 116 could also allow the users to adjust the operation of the sensors 102a, actuators 102b, controllers 106a-106b, or servers 114a-114b. In addition, the operator stations 116 could receive and display warnings, alerts, or other messages or displays generated by the controllers 106a-106b or the servers 114a-114b. Each of the operator stations 116 includes any hardware, software, firmware, or combination thereof for supporting user access and control of the system 100. Each of the operator stations 116 could, for example, represent a computing device running a MICROSOFT WINDOWS operating system.

In this example, the system 100 also includes a wireless network 118, which can be used to facilitate communication with one or more wireless devices 120. The wireless network 118 may use any suitable technology to communicate, such as radio frequency (RF) signals. Also, the wireless devices 120 could represent devices that perform any suitable functions. The wireless devices 120 could, for example, represent wireless sensors, wireless actuators, and remote or portable operator stations or other user devices.

At least one router/firewall 122 couples the networks 112 to two networks 124. The router/firewall 122 includes any suitable structure for providing communication between networks, such as a secure router or combination router/firewall. The networks 124 could represent any suitable networks, such as a pair of Ethernet networks or an FTE network.

In this example, the system 100 includes at least one additional server 126 coupled to the networks 124. The server 126 executes various applications to control the overall operation of the system 100. For example, the system 100 could be used in a processing plant or other facility, and the server 126 could execute applications used to control the plant or other facility. As particular examples, the server 126 could execute applications such as enterprise resource planning (ERP), manufacturing execution system (MES), or any other or additional plant or process control applications. The server 126 includes any hardware, software, firmware, or combination thereof for controlling the overall operation of the system 100.

A historian 128 is also coupled to the networks 124. The historian 128 generally collects information associated with the operation of the system 100. For example, the historian 128 may collect measurement data associated with the operation of the sensors 102a. The historian 128 may also collect control data provided to the actuators 102b. The historian 128 may collect any other or additional information associated with the process control system 100. The historian 128 includes any suitable storage and retrieval device or devices, such as a database.

One or more operator stations 130 are coupled to the networks 124. The operator stations 130 represent computing or communication devices providing, for example, user access to the servers 114a-114b, 126 and the historian 128. Each of the operator stations 130 includes any hardware, software, firmware, or combination thereof for supporting user access and control of the system 100. Each of the operator stations 130 could, for example, represent a computing device running a MICROSOFT WINDOWS operating system.

In particular embodiments, the various servers and operator stations may represent computing devices. For example, each of the servers 114a-114b, 126 could include one or more processors 132 and one or more memories 134 for storing instructions and data used, generated, or collected by the processor(s) 132. Each of the servers 114a-114b, 126 could also include at least one network interface 136, such as one or more Ethernet interfaces. Also, each of the operator stations 116, 130 could include one or more processors 138 and one or more memories 140 for storing instructions and data used, generated, or collected by the processor(s) 138. Each of the operator stations 116, 130 could also include at least one network interface 142, such as one or more Ethernet interfaces.

In one aspect of operation, each of the controllers 104a-104b may operate using one or more models 144. A model 144 generally represents a mathematical model of at least a portion of a process. For example, a model 144 could define the control signals to be provided to one or more actuators 102b based on measurement data from one or more sensors 102a. In some embodiments, each model 144 represents a multivariable statistical model for controlling multiple variables in the process system 100, and the multivariable statistical model can be used to generate one or more control signals for controlling those multiple variables. Each model 144 could represent any suitable type of model for modeling at least a portion of a process.

In general, many models 144 imprecisely model a process system or portion thereof. Even models 144 that are highly accurate at some point may become less accurate over time. Various statistics are often used to represent or denote the accuracy of a model. For example, a multivariable statistical model 144 could be associated with multiple signals, such as multiple output signals generated using the model 144, and these signals are often related or correlated. As an example, the model 144 could be a Principal Component Analysis (PCA) model of the relationships between process variables. In this type of model, multiple outputs can be used to measure the deviation of the model from training data. The Q statistic represents the deviation of multiple signals from a normal relationship or correlation pattern. Another example output for a PCA model is the $T^2$ statistic. The $T^2$ statistic measures the distance of a new observation from the range of observations in the training data. Either or both of these statistics could be used as diagnostic indicators.

As a simple example, consider multiple temperature sensors placed in the same room. Under normal conditions, the outputs of the temperature sensors would have a general relationship or correlation with each other. As the temperature in the room increases, the temperature measured and output by the temperature sensors would also generally increase together. Under this condition, the relationship between the outputs would be generally constant, and the Q statistic would be generally lower. If a heater was placed near one of the temperature sensors, the temperature measured at that sensor location and output by the temperature sensor would diverge from the rest of the temperature sensors. Under this condition, the relationship between the outputs would be more inconsistent, and the Q statistic would be generally larger. Thus, the Q statistic gives a measure of the change in correlation from the normally observed pattern, and the deviation expressed in the Q statistic provides a diagnostic tool. It may be noted, however, that the use of the Q statistic is for illustration only, and any other or additional statistic(s) could be used in the system 100.

In conventional process control systems, a human operator typically monitors a trend plot, which illustrates how a measurement or model output (such as the Q statistic) varies over time. An operator typically has a large number of trend plots to monitor simultaneously. When used to monitor the output of a model, the trend plot allows the operator to, for example, identify when a key statistic varies, indicating that a model may not be precisely modeling at least a portion of a process. However, when a large number of trend plots are used in conjunction with a large number of models, it may be difficult for the operator to easily identify when a particular statistic indicates that a problem exists with a particular model.

In accordance with this disclosure, at least one phase plot generator 146 can be used in the system 100 to generate visual displays containing phase plane plots for users. A phase plane plot generally represents a plot that illustrates changes to a variable and the rate of change of that variable, and phase plane plots are generally associated with non-linear control analysis. A phase plane plot can be used here to highlight changes in the output of a statistical model. Moreover, the phase plane plot could be subdivided into portions, such as quadrants, that represent the overall health or quality of a particular model 144. In addition, one of the quadrants in the phase plane plot could be identified, such as by highlighting a particular quadrant using colors, patterns, or other indicators, to indicate the currently-observed health or quality of a particular model 144. In this way, operators may quickly and easily identify any problems with multiple models used in the system 100. One example of a phase plane plot is shown in FIG. 2, which is described below.

A phase plot generator 146 could be implemented on any suitable component in the system 100, such as on one or more servers or operator stations. Also, the data used to generate the phase plane plots could represent any suitable data, such as data collected by one or more controllers, servers, or historians. Further, any number of phase plot generators 146 could be used within the system 100, such as on a single component (like the server 126) or on multiple components (like on each operator station 116 or 130). Each phase plot generator 146 includes any hardware, software, firmware, or combination thereof for generating one or more visual displays that contain phase plane plots associated with one or more statistics related to the operation of a process system. A particular software implementation of the phase plot generator 146 is provided in the Software Appendix at the end of this Detailed Description.

Although FIG. 1 illustrates one example of a process control system 100, various changes may be made to FIG. 1. For example, a control system could include any number of sensors, actuators, controllers, servers, operator stations, networks, wireless networks, wireless devices, and historians. Also, the makeup and arrangement of the process control system 100 in FIG. 1 is for illustration only. Components could be added, omitted, combined, or placed in any other suitable configuration according to particular needs. Further, while described as being used in conjunction with an early event detection system, the phase plane plots could be used in a stand-alone manner or with any other or additional functionality, such as with a model builder that is used to generate models 144. In addition, FIG. 1 illustrates one operational environment in which visual displays containing phase plane plots can be used. This functionality could be used in any other suitable device or system.

FIG. 2 illustrates an example graphical display 200 presenting changes in statistical parameters in a process control system according to this disclosure. The embodiment of the graphical display 200 shown in FIG. 2 is for illustration only. Other embodiments of the graphical display 200 could be used without departing from the scope of this disclosure. Also, for ease of explanation, the graphical display 200 shown in FIG. 2 is described with respect to the system 100 of FIG. 1. Any other suitable graphical display could be used in the system 100, and the graphical display 200 of FIG. 2 could be used with any other suitable system.

In this example, the graphical display 200 displays information associated with the Q statistic for a process model. This is for illustration only, and any other suitable statistical parameter(s) could be used with the graphical display 200. In this particular example, the statistic is used in conjunction with an early event detection (EED) system, which can be used to detect problems in a process system being monitored and controlled. One example of an EED system is disclosed in U.S. patent application Ser. No. 11/583,219 filed on Oct. 18, 2006, which is hereby incorporated by reference.

As shown in FIG. 2, the graphical display 200 includes a trend plot 202. The trend plot 202 plots Q statistic values along the left vertical axis, time on the horizontal axis, and early event detection values along the right vertical axis. The trend plot 202 includes two lines 204-206, which represent thresholds associated with the statistical parameter being plotted (in this case, the Q statistic). The trend plot 202 also includes a line 208, which represents the actual value of the statistical parameter over time. The trend plot 202 further includes a line 210, which represents a threshold used during early event detection to classify normal versus abnormal operation. When the line 208 equals or exceeds the line 210, this may trigger a notification in the early event detection system. A legend 212 can be used to describe the various lines 204-210 in the trend plot 202. In addition, the trend plot 202 includes scrolling controls 214, which can be used by the user to select a particular time period (where information associated with the statistical parameter during that time period is displayed in the graphical display 200). Timestamps showing the beginning and ending times associated with the displayed information can be presented at the ends of the scrolling controls 214.

The graphical display 200 also includes a phase plane plot 216, which generally plots the value of a statistical parameter (such as the Q statistic) against the rate of change of the statistical parameter (such as the time derivative of the Q statistic). In this example, the phase plane plot 216 is divided into four quadrants 218a-218d, and phase plane points 220 in the phase plane plot 216 denote specific statistical parameter value/rate of change pairs. Lines may couple the points 220 in the phase plane plot 216 to illustrate the progression of the points 220 over time. Also, two cursors 222 may be contained in the trend plot 202 (where a user uses the cursors 222 to select a specific instance of time), and the points 220 in the phase plane plot 216 could represent statistical parameter value/rate of change pairs that precede or are near the selected instance of time. In addition, statistical information 224 associated with the last point 220 in the phase plane plot 216 and the two cursors 222 in the trend plot 202 is displayed at the bottom of the graphical display 200.

A text entry 226 allows a user to specify the number of points 220 displayed in the phase plane plot 216, and a button 228 allows the user to update the phase plane plot 216 with a new number of points 220. A user may need to have certain permissions, such as operator permissions, to alter the number of points 220 displayed in a phase plane plot 216. Also, a connect/disconnect button 230 can be used to select a particular model for which statistical information is displayed in the graphical display 200, and the selected model could be identified in a text box 232.

In this example, the phase plane plot 216 illustrates variations in the Q statistic for a particular model 144 over time. The quadrants 218a-218d in the phase plane plot 216 are used to identify the consistency of a new observation with the particular model 144. For example, when the statistical parameter is generally low, this may indicate that the particular model 144 accurately models a process or portion thereof, and the model 144 is said to have a good "fit." In this case, the phase plane points 220 displayed in the phase plane plot 216 may move relatively closer to the "Good Fit" line along the horizontal axis (in the quadrants 218a-218b). When the statistical parameter is generally high, this may indicate that the particular model 144 does not accurately model a process or portion thereof, and the model 144 is said to have a poor or very poor "fit." In this case, the phase plane points 220 displayed in the phase plane plot 216 may move relatively closer to the "Poor Fit" or "Very Poor Fit" lines along the horizontal axis (in the quadrants 218c-218d).

The phase plane plot 216 can further illustrate the health or quality of the particular model 144, such as whether the model is steady, improving, or degrading. For example, the phase plane plot 216 can illustrate the relationship between observations and highlight whether the consistency of observations with the statistical model is getting better or worse. In this example, the vertical axis represents the rate of change of a key statistic, and the horizontal axis represents the value of the key statistic. If the rate of change of the Q statistic associated with the model 144 is generally low, the phase plane points 220 displayed in the phase plane plot 216 may move relatively closer to the "Steady" line separating the quadrants 218a and 218c from the quadrants 218b and 218d. If the Q statistic associated with the model 144 is high but the rate of change is negative (i.e. the Q statistic had been high but is becoming lower), the phase plane points 220 displayed in the phase plane plot 216 may move relatively closer to the "Improving" line below the quadrants 218b and 218d. If the Q statistic associated with the model 144 is high and the rate of change is positive (i.e. the Q statistic has been high and is going higher), the phase plane points 220 displayed in the phase plane plot 216 may move relatively closer to the "Degrading" line above the quadrants 218a, 218c.

In this way, the phase plane plot 216 can present both the health or quality of the model 144 (along its vertical axis in this example) and the accuracy of the model 144 (along its horizontal axis in this example). Moreover, the phase plane points 220 in the phase plane plot 216 can have different colors, patterns, or other indicators depending on where the phase plane points 220 are displayed. This may help the user to identify at a glance whether the points 220 are more desirable (such as closer to the "Steady," "Improving," or "Good Fit" lines) or less desirable (such as closer to the "Poor Fit," "Very Poor Fit," or "Degrading" lines).

In addition, one of the quadrants 218a-218d can be highlighted or otherwise identified in the phase plane plot 216. For instance, the quadrant containing the largest number of phase plane points 220 could be highlighted using a specific background color, pattern, or other indicator. Also, the highlighting can vary by quadrant to more specifically identify the overall health of the model 144. As particular examples, the quadrant 218b may represent the most preferred quadrant since it generally identifies good fit models that are steady or improving, and this quadrant 218b could be highlighted using one color (such as green). The quadrant 218c may represent the least preferred or worst quadrant since it generally identifies poor fit or very poor fit to normal operational models and that the fit is degrading, and this quadrant 218c could be highlighted using another color (such as magenta). In this way, a user can quickly and easily determine whether a particular model 144 is indicating a process abnormality and requires operator plane plot 216 may move relatively closer to the "Degrading" line above the quadrants 218a, 218c.

In this way, the phase plane plot 216 can present the rate of change in the accuracy of the model 144 (along its vertical axis in this example) and the accuracy of the model relative to training data 144 (along its horizontal axis in this example). Moreover, the phase plane points 220 in the phase plane plot 216 can have different colors, patterns, or other indicators depending on where the phase plane points 220 are displayed. This may help the user to identify at a glance whether the points 220 are more desirable (such as closer to the "Steady," "Improving," or "Good Fit" lines) or less desirable (such as closer to the "Poor Fit," "Very Poor Fit," or "Degrading" lines).

In addition, one of the quadrants 218a-218d can be highlighted or otherwise identified in the phase plane plot 216. For instance, the quadrant containing the largest number of phase plane points 220 could be highlighted using a specific background color, pattern, or other indicator. Also, the highlighting can vary by quadrant to more specifically identify the overall health of the model 144. As particular examples, the quadrant 218b may represent the most preferred quadrant since it generally identifies good fit models that are steady or improving, and this quadrant 218b could be highlighted using one color (such as green). The quadrant 218c may represent the least preferred or worst quadrant since it generally identifies poor fit or very poor fit to normal operational models and that the fit is degrading, and this quadrant 218c could be highlighted using another color (such as magenta). In this way, a user can quickly and easily determine whether a particular model 144 is indicating a process abnormality and requires operator attention. This may be particularly useful when a large number of phase plane plots 216 are presented simultaneously to a user on a display. It may be noted that any other suitable scheme could be used to select the quadrant to be highlighted or otherwise identified (instead of or in addition to selecting the quadrant with the largest number of points 220).

The following represents additional details regarding a specific implementation of the phase plot generator 146 and the phase plane plot 216. As general background for phase plane plots, a first-order differential equation may be of the form y'=F(y,t), where t is an independent variable (often time), y is a dependent variable, and y' is the derivative of y. A second-order differential equation may be of the form y"=F(y,y',t), where y" is the second-order derivative of y. When the functional form of a differential equation is known, there could be various ways to show the solution for the differential equation graphically. For example, one method can include plotting $y_i$ and $y_i'$ for the second-order differential equation against $t_i$, where $t_i$, $y_i$, and $y_i'$ represent the values at time i. A three-dimensional plot of $t_i$, $y_i$, and $y_i'$ could also be used. For the specific case of a PCA model, the equation Q'=dq/dt can be used to estimate the rate of change of the key statistic shown in the phase plane plot 216. In a single-variable case, the phase plane plot 216 can plot Q(i+1)−Q(i) on the vertical axis and Q(i) on the horizontal axis.

In particular embodiments, the key statistical parameter used in the phase plane plot 216 represents the Q statistic, which is associated with the output of a multivariable statistical model. Also, in this example, a two-dimensional plot is used, with the vertical axis representing the rate of change of the Q statistic and the horizontal axis representing the value of the Q statistic. A value of the Q statistic and the statistic's rate of change (denoted "Q dot") can be evaluated over a configurable window because the model 144 can be evaluated against the running-process at each time instant. A pair of values (a Q value and a Q dot value) can be placed on the phase plane plot 216 to give an assessment whether the process is unhealthy and approaching better health, unhealthy and approaching poorer health, healthy and approaching poorer health, or healthy and approaching better health.

It may be noted that the use of the Q statistic is for illustration only. Other statistics, such as the $T^2$ statistic, can also be used. It may also be noted that the rate of change of the Q statistic (Q dot) is for illustration only. Other metrics, such as the logarithmic value of the Q statistic, a Euclidean distance associated with a change in the Q statistic, or an integral of the Q statistic (like $$\int \frac{Q}{dt} \text{ or } \int Q\Delta t$$

could also be used.

As noted above, in some embodiments, the phase plane plot 216 can be used in conjunction with an early event detection application, where the phase plane plot 216 is displayed in the upper pane of the graphical display 200 and the trend plot 202 is displayed in the lower pane of the graphical display 200. The phase plane plot 216 may be generated based on the current cursor position in the trend plot 202, meaning the contents of the phase plane plot 216 can be based on the position of the cursors 222 in the trend plot 202. In other words, upon selection of the cursor position in the trend plot 202, the Q and Q dot values can be retrieved or determined and then displayed in the phase plane plot 216.

As shown in FIG. 2, the phase plane plot 216 includes an "Advanced Options" button 234, which can be used to configure various options of the plot 216. A user may need certain permissions, such as engineering permissions, to alter these options. These options could, for example, be related to an EED model, stored in an EED toolkit, and viewed in a configuration parameter explorer. In some embodiments, the options that can be set by the user include span options, plot options, and limit options. Span options can include a span of the Q dot values (such as between one and fifty) and a moving average window value (used to remove variation in the moving average). The plot options can include a quadrant zero threshold value, which can be calculated based on an underlying PCA model. The plot options can also include a minimum Q high limit. In addition, the plot options can include a maximum number of allowed "bad" (unreliable) statistical values, where points 220 associated with more than this number are not displayed and bad values are changed to their preceding good values when this number is not exceeded. The limit options may include a Q dot lower limit and a Q dot upper limit, where the default lower limit may be −10 and the default upper limit may be +10.

In particular embodiments, the plot options may include a fuzzy limit, which can be used to determine when an event it likely to occur. Also, the quadrant zero threshold value in the plot options can be calculated from the fuzzy limit (such as 75% of an 80% fuzzy limit). Further, the minimum Q high limit in the plot options may be calculated using the fuzzy limit (such as 1.5 times the 80% fuzzy limit). In addition, it may be noted that if the moving average window value is less than the quadrant zero threshold, the zero quadrant (quadrant 218b) could be highlighted and remain highlighted.

Although FIG. 2 illustrates one example of a graphical display 200 presenting changes in statistical parameters in a process control system, various changes may be made to FIG. 2. For example, the phase plane plot 216 can be used in any suitable display and need not be used in conjunction with the trend plot 202. Also, any suitable controls could be used to control the phase plane plot 216. In addition, while shown as using various patterns to, for example, distinguish types of phase plane points 220 and to highlight a quadrant, any suitable type(s) of indictor(s) could be used in the display 200.

FIG. 3 illustrates an example method 300 for displaying changes in statistical parameters in a process control system according to this disclosure. The embodiment of the method 300 shown in FIG. 3 is for illustration only. Other embodiments of the method 300 could be used without departing from the scope of this disclosure. Also, for ease of explanation, the method 300 is described with respect to the graphical display 200 of FIG. 2 used in the system 100 of FIG. 1. The method 300 could be used with any suitable graphical display and in any suitable system.

A model associated with a process control system is selected at step 302. This may include, for example, the user selecting a particular model from a list of models. The model could be stored and/or used in any suitable location in the process control system 100, such as in a controller, server, operator station, or historian.

A specified period of time associated with operation of the model is identified at step 304. This may include, for example, the user identifying a specific period of time. This may also include a periodic time for reevaluation of the model's outputs occurring.

A key statistic for the identified model is identified at step 306. This could include, for example, the phase plot generator 146 selecting one of multiple statistics, such as the Q statistic or the $T^2$ statistic. In some embodiments, a particular key statistic may be specified for use, and identification of the key statistic may not be needed.

Phase plane points are identified for display at step 308. This may include, for example, the phase plot generator 146 identifying values of the key statistic and a rate of change for the key statistic. The number of values identified could depend on a user-controlled setting. Also, the values of the key statistic and its rate of change could be determined using any suitable data, such as data stored in a historian. In addition, the data used to determine the values of the key statistic and its rate of change could be controlled by the user, such as by the user selecting a specific period of time as described above.

A quadrant to highlight is selected at step 310. This may include, for example, the phase plot generator 146 using specific rules or other logic to determine which of the quadrants 218a-218d should be highlighted. As a particular example, the quadrant could be selected based on the phase plane points 220 identified in the prior step, such as by selecting the quadrant containing the largest number of points (although any other suitable technique could be used).

A graphical display is generated at step 314. This may include, for example, the phase plot generator 146 generating a phase plane plot 216 having the identified phase plane points 220. This may also include the phase plot generator 146 giving each phase plane point 220 a particular pattern, color, or shading depending on where the phase plane points 220 lie in the quadrants 218a-218d. This may further include giving the selected quadrant a particular pattern, color, or shading (such as highlighting) to illustrate the general health of the selected model. The graphical display is then presented to a user at step 316, which may include presenting the generated display on a display device and/or communicating information defining the generated display over a network to a user device.

If a new period of time is identified (such as by the user or when a periodic time for reevaluation of the model's outputs is reached), the process may return to step 308. In this way, the display can be updated to include new phase plane points, and (if necessary) a different portion of the phase plane plot can be highlighted.

Although FIG. 3 illustrates one example of a method 300 for displaying changes in statistical parameters in a process control system, various changes may be made to FIG. 3. For example, while shown as a series of steps, various steps in FIG. 3 could overlap, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

SOFTWARE APPENDIX

Copyright Honeywell International Inc.

```
function [M] =
AnimateQplot(model,starttime,endtime,window,dqspan,limits,makemovie)
% --- help for AnimateQplot ---
%
% [ ] = AnimateQplot(model,starttime,endtime,window,dqspan,limits)
%
% simulates the behavior of phase plane-based user interface for the
% Q statistic and its rate of change
%
% Inputs:
%     model -- an SETools PCA model
%     starttime -- start of the simulation
%     endtime -- end of the simulation
%     window -- the number of points to show in the phase plane
%     dqspan -- difference to use in rate of change calculation for Q
%     limits -- plot limits
%     makemovie - indicates if a movie should be captured
%
% Notes:
%     (1)  data needs to be available for the model in the range of
%          starttime->endtime
%     (2)  assumes that SETools is started and the model is loaded
%
feature('UseGenericOpenGL',1)
% create the casesubset and generate Q statistic for the model
startnum = datenum(starttime)−120/60/24;   % go back far enough in time
                                           % to preload the trend
endnum = datenum(endtime);
cs_test=casesubset(startnum,endnum);
[Q,ts]=qresids(model,cs_test);
[xres,ts]=resids(model,cs_test);
tagnames = model.Inputs;
% make the plot, and capture a movie if requested
M = qplot(Q',1.0,window,dqspan,limits,ts,makemovie,xres,tagnames);
%-----------------------------------------------------------------
function [M] =
qplot(q,deltaT,window,dqspan,limits,ts,makemovie,xres,tagnames)
%-----------------------------------------------------------------
% qplot(q,deltaT,window,dqspan,limits,ts,makemovie) plots phase plane
% plot of Q (Q vs. Qdot)
%
% Inputs
%     q -- Q statistic over the time range of interest
%     deltaT -- time difference between measurements of q
%     window -- specifies the number of data points to be displayed in
%               the phase plane plot
%     dwspan -- specifies the span (dT) for calculating the rate of
%               change
%     limits -- specifies the min/max Q, min/max Qdot to be displayed
%     ts -- time vector for the range of interest
%     makemovie -- indicates if a movie should be captured
%     xres -- residual prediction error
%     tagnames -- variable names for the model, used for bad actors
%                 display
close all
% set the number of samples shown in the trend
plotlen = 120;
% set the fuzzy limits
fuzzy_limits = [200 700];
% smooth the Q values
qsmooth=smooth(q,limits);
% calculate the derivative, and truncate to plot limits
dq=0*qsmooth;
for i = (dqspan+1):(length(q)−window−1)
    dq(i) = (qsmooth(i)−qsmooth(i−dqspan))/(deltaT*dqspan);
    if (dq(i)>limits(4))
        dq(i)=limits(4);
    end
    if (dq(i)<limits(3))
        dq(i)=limits(3);
    end
end
% calculate a truncated q, so that plots show the saturated value
qtruncate = q;
for i=1:length(qtruncate)
    if (qtruncate(i)>limits(2))
        qtruncate(i)=limits(2);
    end
    if (qtruncate(i)<limits(1))
        qtruncate(i)=limits(1);
    end
end
%----------------------------------
% set up the plots
%----------------------------------
figure(1)
tidy % place the plot nicely
subplot(212)
ylabel('Q')
hq = plot((1:(1+window)),q(1:(1+window)));
hold on;
h1 = plot((2:2+window),q(2:2+window), 'LineWidth', 3,'Color',[100 0 200]/255);
hend = plot((2+window),q(2+window), '-o','LineWidth', 1,'Color',[240 30 190]/255);
npoints = length(ts);
axis([0 plotlen 0 max(250,max(q(2:2+window)))]);
% place limit line for Q on the plot
hlow = line([0 npoints],[fuzzy_limits(1) fuzzy_limits(1)]);
set(hlow,'Color',[236 183 95]/255);
set(hlow,'LineWidth',2)
% show the clock time on the plot
curaxis = axis;
stime=datestr(ts(1));
htime = text(plotlen*6/8,curaxis(4)*7/8,stime,'FontSize',7);
% and the bad actors list
hactors = text(20,curaxis(4)*7/8,'','FontSize',7,'Color',[100 0 200]/255,'FontWeight','bold')
%----------------------------------
% start storing the movie
%----------------------------------
if (makemovie == 1)
    M(:,1) = getframe;
end
%----------------------------------
% run through the data & display charts
%----------------------------------
qtruncate = q;
istep = 1;
for i = (2+plotlen):(length(q)−window−1)
    % ---------------first, the phase plane plot for Q/Qdot
    h11 = subplot(211);
    plotrange = i:(i+window);
    plotrange = (i−window):i;
    arrowplot(qtruncate(plotrange),dq(plotrange));
    % adjust the axis limits to reflect Q
    qmax = max(700,max(q(plotrange)));
    axis([0 1.1*qmax −11 11.1 ]);
    % identify and color the appropriate quadrant
    [iquad]=identify_quadrant(qtruncate(plotrange),dq(plotrange),limits,fuzzy_limits);
    color_quadrant(iquad,axis,fuzzy_limits);
    % put the axis text labels on the y axis (Qdot)
    curaxis = axis;
    text(−60*curaxis(2)/700,8,'Degrading','FontSize',7)
    text(−60*curaxis(2)/700,−8,'Improving','FontSize',7)
    text(−60*curaxis(2)/700,0,'Steady','Fontsize',7)
    % dynamically adjust the axis text labels for the x axis (Q)
    if (curaxis(2) < 2000)
        text(0,−12,'Good Fit','FontSize',7)
    end
    text(200,−12,'Poor Fit','FontSize',7)
    text(600/700*curaxis(2),−12,'Very Poor Fit','FontSize',7)
    set(h11,'XColor',[0.8 0.8 0.8],'YColor',[0.8,0.8,0.8])
    % place limit lines for Q on the phase plane plot as well
    hlow = line([fuzzy_limits(1) fuzzy_limits(1)],[−11 11]);
    set(hlow,'Color',[236 183 95]/255);
    set(hlow,'LineWidth',2)
    % ------------now plot the moving trend for the Q statistic
    subplot(212);
    set(hq,'xdata', 1:plotlen,'ydata', q((i−plotlen+1):i));
```

-continued
```
    set(h1,'xdata', ([plotlen-window]:(plotlen-1)),'ydata',
q((plotrange):(i-1)));
    set(hend,'xdata', (plotlen),'ydata', q(i));
    ylabel('Q')
    xlabel('Minutes')
    curaxis = axis;
    axis([0 plotlen 0 max(250,max(q((i-plotlen+1):i)))*1.05)]);
    % put the time on the plot
    stime=datestr(ts(i));
    set(htime,'String',stime);
    set(htime,'Position',[80 curaxis(4)*7/8 0]);
    % find the key contributors, if Q is high enough
    set(hactors,'Position',[20 curaxis(4)*7/8 0])
    if iquad > 0
       [Y,icontrib]=sort(xres(i,:));
       S1 = sprintf('%s %s %s',...
          char(tagnames(icontrib(1))),...
          char(tagnames(icontrib(2))),...
          char(tagnames(icontrib(3)))); ...
       set(hactors,'String',s1)
    else
       set(hactors,'String','')
    end
    if (makemovie == 1)
       istep = istep+1;
       M(:,istep) = getframe;
    end
    pause(0.2);
end
%----------------------------------------------------------------
function arrowplot(x,y)
%----------------------------------------------------------------
% thetavec = atan(diff(y)./diff(x));
% mags = sqrt(diff(y).^2 + diff(x).^2);
% u = [mags.*cos(thetavec) 0];
% v = [mags.*sin(thetavec) 0];
% quiver(x,y,u,v,0);
plot(x(1:(length(x))),y(1:(length(x))), '-o','MarkerFaceColor',[100 0 200]/255,'MarkerEdgeColor',[100 0 200]/255)
hold on
plot(x(length(x)),y(length(x)), '-o','MarkerFaceColor',[240 30 190]/255, ...
    'MarkerEdgeColor',[240 30 190]/255)
hold off
%----------------------------------------------------------------
function qsmooth=smooth(q, limits)
%----------------------------------------------------------------
window = 3;
qsmooth = q;
for i=window:length(q)
    qsmooth(i) = mean(q((i-window+1):i));
end
%----------------------------------------------------------------
function [iquad]=identify_quadrant(q,qdot,limits,fuzzy_limits)
%----------------------------------------------------------------
% check if q is well within limits -- if so, no need to compute
% the quadrant details
if (mean(q) < 150)
    iquad = 0;
else
    % identify samples in the window where q is over the limit
    qhigh = find(q>fuzzy_limits(1));
    qstate = zeros(1,length(q));
    qstate(qhigh) = qstate(qhigh) + 1;
    % and identify where q is increasing
    qdot_high = find(qdot>0);
    qdotstate = zeros(1,length(qdot));
    qdotstate(qdot_high) = qdotstate(qdot_high) + 1;
    % now calculate the quadrant indices by treating the pair of
    % states as a binary number
    % 0 == q < fuzzy limit, qdot negative
    % 1 == q < fuzzy limit, qdot positive
    % 2 == q > fuzzy limit, qdot negative
    % 3 == q > fuzzy limit, qdot positive
    % this will result in a vector of quadrants, which we can then
    % process to decide how change the coloring of the graph
    quadrants = bitshift(qstate,1)+qdotstate;
    % now, which is the "winning" quadrant? we start by looking at
    % the most common value in specified time period (such as in the
    % last 10 minutes)
    iquad = mode(quadrants);
end
%----------------------------------------------------------------
function [ ]=color_quadrant(iquad,limits,fuzzy_limits)
%----------------------------------------------------------------
% color the current quadrant in the q/qdot plot
quadrant_colors = [
    41 245 70; % green
    255 255 255 % white
    254 138 32; % orange
    253 21 220; % magenta
]/255;
if iquad == 0
    xvertices = [limits(1) limits(1) fuzzy_limits(1) fuzzy_limits(1)];
    yvertices = [limits(3) 0 0 limits(3)];
elseif iquad == 1
    xvertices = [limits(1) limits(1) fuzzy_limits(1) fuzzy_limits(1)];
    yvertices = [0 limits(4) limits(4) 0];
elseif iquad == 2
    xvertices = [fuzzy_limits(1) fuzzy_limits(1) limits(2) limits(2)];
    yvertices = [limits(3) 0 0 limits(3)];
elseif iquad == 3
    xvertices = [fuzzy_limits(1) fuzzy_limits(1) limits(2) limits(2)];
    yvertices = [0 limits(4) limits(4) 0];
end
h1 = patch(xvertices,yvertices,quadrant_colors(iquad+1,:),...
    'LineStyle','none','FaceAlpha',0.3);
```

What is claimed is:

1. A method comprising:
identifying at least one statistical output associated with a process model;
generating a first graphical display comprising a plot line having a plurality of first points, each first point based on the at least one statistical output;
generating a second graphical display comprising a plot having one or more second points, the plot having a first axis associated with values of the first points and a second axis associated with a rate of change between two or more of the first points, wherein the second graphical display comprises multiple portions;
presenting the first and second graphical displays concurrently to a user;
detecting a change in a position of a cursor on the plot line of the first graphical display;
updating the second graphical display based on the position of the cursor; and
selecting one of the portions of the second graphical display based on at least one of the one or more second points;
wherein the different portions of the second graphical display are associated with both (i) a fit of the process model to current process conditions and (ii) a change in the model fit as a function of time; and
wherein the different portions of the second graphical display comprise four quadrants of the plot of the second graphical display, each quadrant representing one of four states of the process model, the four states comprising:
(i) a poor fit to current conditions and approaching a better fit;
(ii) a poor fit to current conditions and approaching a poorer fit;
(iii) a good fit to current conditions and approaching a poorer fit; and (iv) a good fit to current conditions and approaching a better fit.

2. The method of claim 1, wherein:
the process model comprises a multivariable statistical model; and
the at least one statistical output comprises at least one deviation of multiple output signals of the multivariable statistical model from a normal correlation pattern.

3. The method of claim 1, wherein:
the process model comprises a multivariable statistical model; and
the at least one statistical output comprises at least one correlation factor among multiple variables of the multivariable statistical model.

4. The method of claim 1, further comprising highlighting the selected portion of the second graphical display.

5. The method of claim 4, wherein the selected portion of the second graphical display is highlighted using an indicator that depends on the portion selected.

6. The method of claim 1, further comprising:
displaying, in a status line, statistical information associated with a final one of the second points in the second graphical display.

7. The method of claim 1, further comprising:
receiving information from the user defining a time period for the first graphical display and a number of points to display in the second graphical display.

8. The method of claim 1, wherein:
the plot line in the first graphical display comprises a trend plot associated with the process model; and
the second graphical display comprises a phase plane plot associated with the trend plot.

9. An apparatus comprising:
at least one memory configured to store at least one statistical output associated with a process model; and
at least one processor configured to:
generate a first graphical display comprising a plot line having a plurality of first points, each first point based on the at least one statistical output;
generate a second graphical display comprising a plot having one or more second points, the plot having a first axis associated with values of the first points and a second axis associated with a rate of change between two or more of the first points, wherein the second graphical display comprises multiple portions;
present the first and second graphical displays concurrently to a user;
detect a change in a position of a cursor on the plot line of the first graphical display;
update the second graphical display based on the position of the cursor; and
select one of the portions of the second graphical display based on at least one of the one or more second points;
wherein the different portions of the second graphical display are associated with both (i) a fit of the process model to current process conditions and (ii) a change in the model fit as a function of time; and
wherein the different portions of the second graphical display comprise four quadrants of the plot of the second graphical display, each quadrant representing one of four states of the process model, the four states comprising:
(i) a poor fit to current conditions and approaching a better fit;
(ii) a poor fit to current conditions and approaching a poorer fit;
(iii) a good fit to current conditions and approaching a poorer fit; and
(iv) a good fit to current conditions and approaching a better fit.

10. The apparatus of claim 9, wherein:
the process model comprises a multivariable statistical model; and
the at least one statistical output comprises at least one deviation of multiple output signals of the multivariable statistical model from a normal correlation pattern.

11. The apparatus of claim 9, wherein:
the process model comprises a multivariable statistical model; and
the at least one statistical output comprises at least one correlation factor among multiple variables of the multivariable statistical model.

12. The apparatus of claim 9, wherein the at least one processor is further configured to highlight the selected portion of the second graphical display, the selected portion highlighted using an indicator that depends on the portion selected.

13. The apparatus of claim 9, wherein the at least one processor is further configured to:
display, in a status line, statistical information associated with a final one of the second points in the second graphical display.

14. The apparatus of claim 9, wherein:
the apparatus further comprises a network interface; and
the at least one processor is configured to present the first and second graphical displays to the user by transmitting information defining the graphical displays to a device associated with the user over at least one network.

15. A non-transitory computer readable medium embodying a computer program, the computer program comprising computer readable program code for:
identifying at least one statistical output associated with a process model;
generating a first graphical display comprising a plot line having a plurality of first points, each first point based on the at least one statistical output;
generating a second graphical display comprising a plot having one or more second points, the plot having a first axis associated with values of the first points and a second axis associated with a rate of change between two or more of the first points, wherein the second graphical display comprises multiple portions;
presenting the first and second graphical displays concurrently to a user;
detecting a change in a position of a cursor on the plot line of the first graphical display;
updating the second graphical display based on the position of the cursor; and
selecting one of the portions of the second graphical display based on at least one of the one or more second points;
wherein the different portions of the second graphical display are associated with both (i) a fit of the process model to current process conditions and (ii) a change in the model fit as a function of time; and
wherein the different portions of the second graphical display comprise four quadrants of the plot of the second graphical display, each quadrant representing one of four states of the process model, the four states comprising:

(i) a poor fit to current conditions and approaching a better fit;
(ii) a poor fit to current conditions and approaching a poorer fit;
(iii) a good fit to current conditions and approaching a poorer fit; and
(iv) a good fit to current conditions and approaching a better fit.

16. The non-transitory computer readable medium of claim 15, wherein:
the process model comprises a multivariable statistical model; and
the at least one statistical output comprises at least one deviation of multiple output signals of the multivariable statistical model from a normal correlation pattern.

17. The non-transitory computer readable medium of claim 15, wherein:
the process model comprises a multivariable statistical model; and
the at least one statistical output comprises at least one correlation factor among multiple variables of the multivariable statistical model.

18. The non-transitory computer readable medium of claim 15, wherein the computer program further comprises computer readable program code for highlighting the selected portion of the second graphical display.

19. The non-transitory computer readable medium of claim 18, wherein the selected portion of the second graphical display is highlighted using an indicator that depends on the portion selected.

20. The non-transitory computer readable medium of claim 15, wherein the computer program further comprises computer readable program code for receiving information from the user defining a time period for the first graphical display and a number of points to display in the second graphical display.

* * * * *